United States Patent [19]

Edling

[11] Patent Number: 5,766,062
[45] Date of Patent: Jun. 16, 1998

[54] PORTABLE POWER TOOL

[75] Inventor: Jan Krister Johansson Edling, Älvsjö, Sweden

[73] Assignee: Atlas Copco Tools AB, Nacka, Sweden

[21] Appl. No.: 871,499

[22] Filed: Jun. 9, 1997

[30] Foreign Application Priority Data

Jun. 13, 1996 [SE] Sweden .................. 9602328

[51] Int. Cl.⁶ .................................................. B23B 23/00
[52] U.S. Cl. ..................... 451/451; 451/359; 451/454; 83/546
[58] Field of Search ........................ 451/344, 359, 451/451, 454, 455, 456; 83/860, 546

[56] References Cited

U.S. PATENT DOCUMENTS

| 3,673,744 | 7/1972 | Oimoen .................. 451/353 |
| 4,891,915 | 1/1990 | Yasuda .................. 451/451 |
| 4,924,635 | 5/1990 | Rudolf et al. ........... 451/451 |
| 5,237,781 | 8/1993 | Demetrius ............... 451/456 |
| 5,518,442 | 5/1996 | Clowers et al. ......... 451/456 |

*Primary Examiner*—Eileen P. Morgan
*Attorney, Agent, or Firm*—Frishauf, Holtz, Goodman, Langer & Chick

[57] ABSTRACT

A portable power tool for operating a wheel type grinding or cutting working implement comprises a housing (10), a rotating output spindle (11) with a working implement supporting flange (14), a safety guard (16) adjustably supported on a guide flange (15) on the housing (10), and a selectively operable arresting device (18) for positively engaging lock openings (20) on the safety guard (16) for locking the latter in alternative positions relative to the housing (10), wherein the support flange (14) is provided with a number of peripheral indentations (21), and the arresting device (18) comprises a lock bolt (19) which is longitudinally shiftable between a first position in which it engages either one of the lock openings (20) on the safety guard (16), a second position in which it engages either one of the lock openings (20) on the safety guard (16) as well as either one of the support flange (14) indentations (21), and a third position in which it neither engages anyone of the safety guard (16) lock openings (20) nor anyone of the support flange (14) indentations (21). A spring means (28, 29) is provided to bias the lock bolt (19) toward the first position.

24 Claims, 4 Drawing Sheets

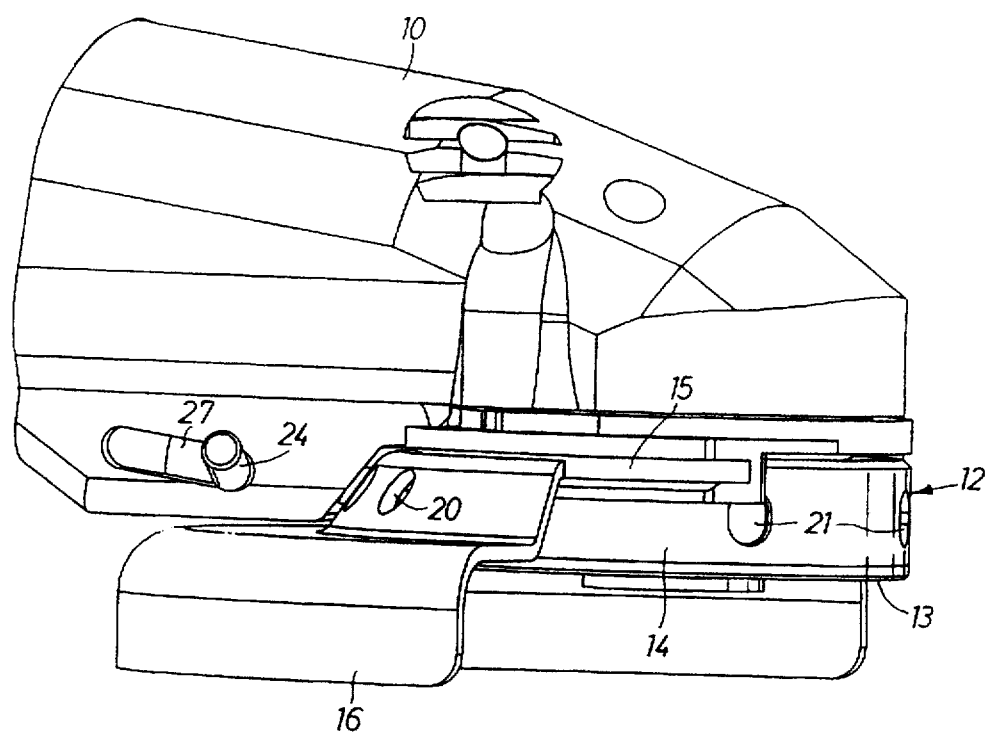

PORTABLE POWER TOOL

This invention pertains to a portable power tool intended for operating a wheel type grinding or cutting working implement.

In particular, the invention concerns a power tool of the above type including a housing, a rotation motor, an output spindle drivingly connected to the motor, a working implement supporting flange carried on the output spindle, a safety guard partially surrounding the working implement and movably supported on the housing for movement between alternative positions, and a selectively operable arresting device for engagement with a lock means on the safety guard in the alternative positions of the latter.

A power grinder of this type is previously described in U.S. Pat. No. 4,924,635. Each one of the three embodiments or the safety guard arresting device shown in this patent comprises a pivotable maneuver lever by which latch dogs are disengaged from a safety guard locking means for enabling adjustment of the safety guard working position.

In DE 43 37 023 and DE 43 44 128 there are shown power grinders provided with spindle arresting means by which fitting and removal of grinding tools on the output spindle is facilitated.

An object of the invention is to provide a portable power grinder of the initially described type in which a safety guard locking means in a structively simple way is combined with an output spindle arresting device.

A preferred embodiment of the invention is below described in detail with reference to the accompanying drawings.

On the drawings:

FIG. 1 shows a perspective view of the front section of a power tool according to the invention.

FIG. 2 shows a side view of the power tool in FIG. 1.

FIG. 3a shows a longitudinal section through the power tool in FIG. 1, illustrating the arresting device in a safety guard locking position.

FIG. 3b shows the same section as in FIG. 3a, but illustrates the arresting device in a safety guard and output spindle locking position.

FIG. 3c shows the same section as in FIG. 3a but illustrates the arresting device in a retracted inactive position.

FIG. 4 shows, on a larger scale, a longitidinal section through the arresting device.

The power tool illustrated in the drawing figures comprises a housing 10 in which is located a rotation motor (not shown), and an output spindle 11. At its outer end, the latter carries a ball type automatic balancing device 12 which is formed with a flat radial surface 13 for supporting axially a working implement attached to the spindle 11. Accordingly, the balancing device 12 forms a support flange 14 for the working implement.

A balancing device of this type is previously known per se through GB 832 048 and does not form any part of this invention.

At the output end of the tool housing 10, there is provided a guide flange 15 which is located concentrically with the output spindle 11 and on which is adjustable mounted a safety guard 16. The latter is rotatably adjustable in a well known manner to facilitate operation of the grinder in different working positions.

The housing 10 is provided with a selectively operable safety guard arresting device 18 which comprises a bore 17 in the housing 10 extending substantially radially in relation to the output spindle 11 and a lock bolt 19 which is longitudinally displaceable in the bore 17. The lock bolt 19 is shiftable between three alternative positions, namely a first position in which it locks both the safety guard 16 against movement, a second position in which it locks both the safety guard against movement and the output spindle against rotation, and a third inactive position in which it locks neither the safety guard 16 nor the output spindle 11.

For obtaining these lock functions, the safety guard 16 is provided with a number of through openings 20 arranged in a circumferential row, and the balancing device 12 is formed with a number of indentations or dead end holes 21 on its periphery. The housing 10 is formed with a heel 22 which is located between the safety guard 16 and the balancing device 12 and which has a guide bore 23 to form a radial support for the lock bolt 19.

In its first position, illustrated in FIG. 3a, the lock bolt 19 extends through one of the openings 20 in the safety guard 16 and reaches about half way into the guide bore 23 in the housing heel 22. In this position, the safety guard 16 is locked against rotation.

This is the neutral position of the lock bolt 19, which the latter normally occupies during operation of the tool.

In its second position, illustrated in FIG. 3b, the lock bolt 19 is displaced toward the center of the output spindle 11 and engages by its forward end one of the dead end holes 21 of the balancing device 12. In this position, the lock bolt 19 prevents positively any rotation of the output spindle 11 in order to facilitate mounting or removal of a grinding or cutting wheel.

In its third position, illustrated in FIG. 3c, the lock bolt 19 is retracted from the holes 21 of the balancing device 12 as well as from the openings 20 of the safety guard 16. The angular position of the safety guard 16 may now be altered.

For manual operation of the lock bolt 19, there is provided a lateral handle 24. The latter is secured to the lock bolt 19 by a coaxial pin 25 and extends to the outside of the housing 10 through a slot 27.

For centralizing the lock bolt 19 in its first, normal operating position, there are provided two springs 28, 29 acting in opposite direction. One of the springs 28 acts on the lock bolt 19 in a direction away from the spindle locking position, whereas the other spring 29 biasses the lock bolt 19 in a direction away from the inactive third position in which the safety guard 16 is unlocked.

The spring 28 encircles the lock bolt 19 and takes support against a shoulder 30 in the bore 17, whereas the spring 29 takes support against a plug 31 secured in the bore 17.

At its forward end, the lock bolt 19 is formed with a bevelled end surface 33 the purpose of which is to prevent the lock bolt 19 from entering the holes 21 during rotation of the output spindle 11. The surface 33 faces a direction opposite to the direction of rotation of the output spindle 11 which is illustrated by the arrow in FIGS. 3a–c. An accidental engagement between the lock bolt 19 and anyone of the holes 21 on the balancing device 12 during rotation of the latter would be hazardous to both the tool parts and to the operator. This is prevented by the orientation of the surface 33.

The angle of inclination of the bevelled surface 33 is illustrated by the letter α in FIG. 4. In practice, the inclination angle α should be in the range of 5° to 12° to provide a safe operation. An angle of 8° has proven to work well.

At its rear end, the lock bolt 19 is formed with a tubular socket portion 34 for guidingly supporting one end of the spring 29. A transverse aperture 35 is provided in the lock bolt 19 for receiving the inner end of the maneouver handle 24. The coaxial pin 25 is formed with a radial flange 36 which is engaged by the spring 29 to retain the pin 25 in its handle locking position. See FIG. 4.

By this concept in which a combined safety guard and output spindle arresting means is provided, there is obtained a structively simple power tool design as well as a simple tool handling.

It is to be understood that the embodiments of invention are not limited to the above described example but could be freely varied within the scope of the claims.

I claim:

1. Portable power tool for operating a wheel type grinding or cutting working implement, comprising a housing (10), a rotation motor, an output spindle (11) drivingly connected to said motor, a working implement supporting flange (14) carried by said output spindle (11), a safety guard (16) partially surrounding the working implement and movably supported on said housing (10) for movement between alternative positions, and a selectively operable arresting device (18) for engagement with a lock means (20) on said safety guard (16) in said alternative positions, characterized in that said support flange (14) is provided with a number of indentations (21), and said arresting device (18) is shiftable between a first position in which it engages said lock means (20) on said safety guard (16), a second position in which it engages both said lock means (20) on said safety guard (16) and either one of said indentations (21) on said support flange (14), and a third position in which it neither engages said safety guard lock means (20) nor anyone of said indentations (21) on said support flange (14).

2. Power tool according to claim 1, wherein a spring means (28,29) is provided to bias said arresting device (18) toward said first position.

3. Power tool according to claim 1, wherein said arresting device (18) comprises a bolt (19) which is longitudinally displaceable between said first, second and third positions.

4. Power tool according to claim 3, wherein said lock means (20) comprises a number of apertures in said safety guard (16), and said bolt (19) is arranged to penetrate through said apertures in said first and said second positions.

5. Power tool according to claim 1, wherein said bolt (19) is supported in a guide bore (17) in said housing (10), and a maneouver handle (24) is attached to said bolt (19) in a perpendicular disposition.

6. Power tool according to claim 1, wherein each one of said indentations (21) on said support flange (14) comprises a cylindrical dead end hole (21).

7. Power tool according to claim 2, wherein said arresting device (18) comprises a bolt (19) which is longitudinally displaceable between said first, second and third positions.

8. Power tool according to claim 7, wherein said lock means (20) comprises a number of apertures in said safety guard (16), and said bolt (19) is arranged to penetrate through said apertures in said first and said second positions.

9. Power tool according to claim 2, wherein said bolt (19) is supported in a guide bore (17) in said housing (10), and a maneouver handle (24) is attached to said bolt (19) in a perpendicular disposition.

10. Power tool according to claim 3, wherein said bolt (19) is supported in a guide bore (17) in said housing (10), and a maneouver handle (24) is attached to said bolt (19) in a perpendicular disposition.

11. Power tool according to claim 4, wherein said bolt (19) is supported in a guide bore (17) in said housing (10), and a maneouver handle (24) is attached to said bolt (19) in a perpendicular disposition.

12. Power tool according to claim 7, wherein said bolt (19) is supported in a guide bore (17) in said housing (10), and a maneouver handle (24) is attached to said bolt (19) in a perpendicular disposition.

13. Power tool according to claim 8, wherein said bolt (19) is supported in a guide bore (17) in said housing (10), and a maneouver handle (24) is attached to said bolt (19) in a perpendicular disposition.

14. Power tool according to claim 2, wherein each one of said indentations (21) on said support flange (14) comprises a cylindrical dead end hole (21).

15. Power tool according to claim 3, wherein each one of said indentations (21) on said support flange (14) comprises a cylindrical dead end hole (21).

16. Power tool according to claim 4, wherein each one of said indentations (21) on said support flange (14) comprises a cylindrical dead end hole (21).

17. Power tool according to claim 5, wherein each one of said indentations (21) on said support flange (14) comprises a cylindrical dead end hole (21).

18. Power tool according to claim 7, wherein each one of said indentations (21) on said support flange (14) comprises a cylindrical dead end hole (21).

19. Power tool according to claim 8, wherein each one of said indentations (21) on said support flange (14) comprises a cylindrical dead end hole (21).

20. Power tool according to claim 9, wherein each one of said indentations (21) on said support flange (14) comprises a cylindrical dead end hole (21).

21. Power tool according to claim 10, wherein each one of said indentations (21) on said support flange (14) comprises a cylindrical dead end hole (21).

22. Power tool according to claim 11, wherein each one of said indentations (21) on said support flange (14) comprises a cylindrical dead end hole (21).

23. Power tool according to claim 12, wherein each one of said indentations (21) on said support flange (14) comprises a cylindrical dead end hole (21).

24. Power tool according to claim 13, wherein each one of said indentations (21) on said support flange (14) comprises a cylindrical dead end hole (21).

* * * * *

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

Column 1, beneath line 1 (PORTABLE POWER TOOL), insert:

--Background of the Invention--;

Above line 25 insert, --Object of the Invention--;

line 32, change "On the drawings:" to

--Brief Description of the Drawings--;

Above line 47 insert, --Detailed Description--.

Column 3, line 11 (claim 1, line 1), change "Portable" to

Figure 1:
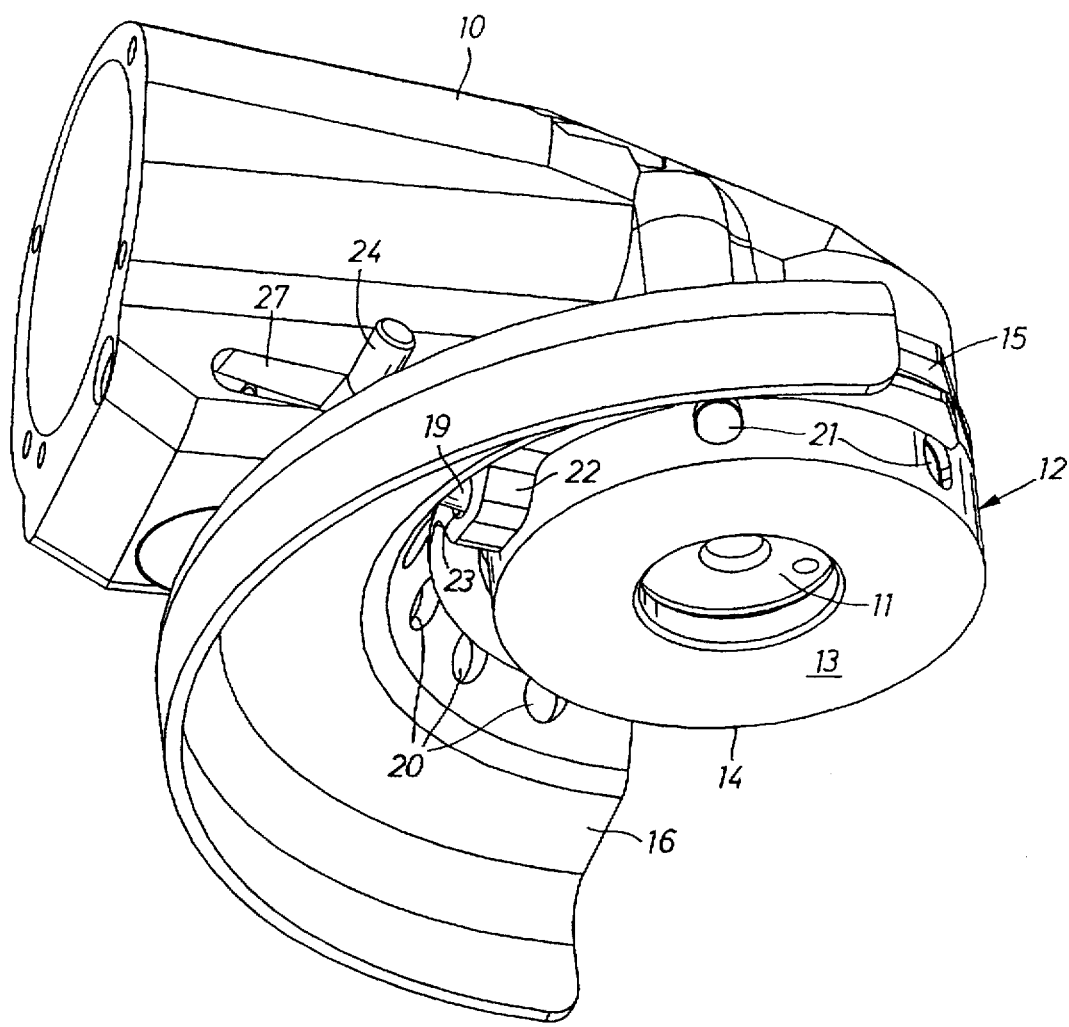
Figure 3A:
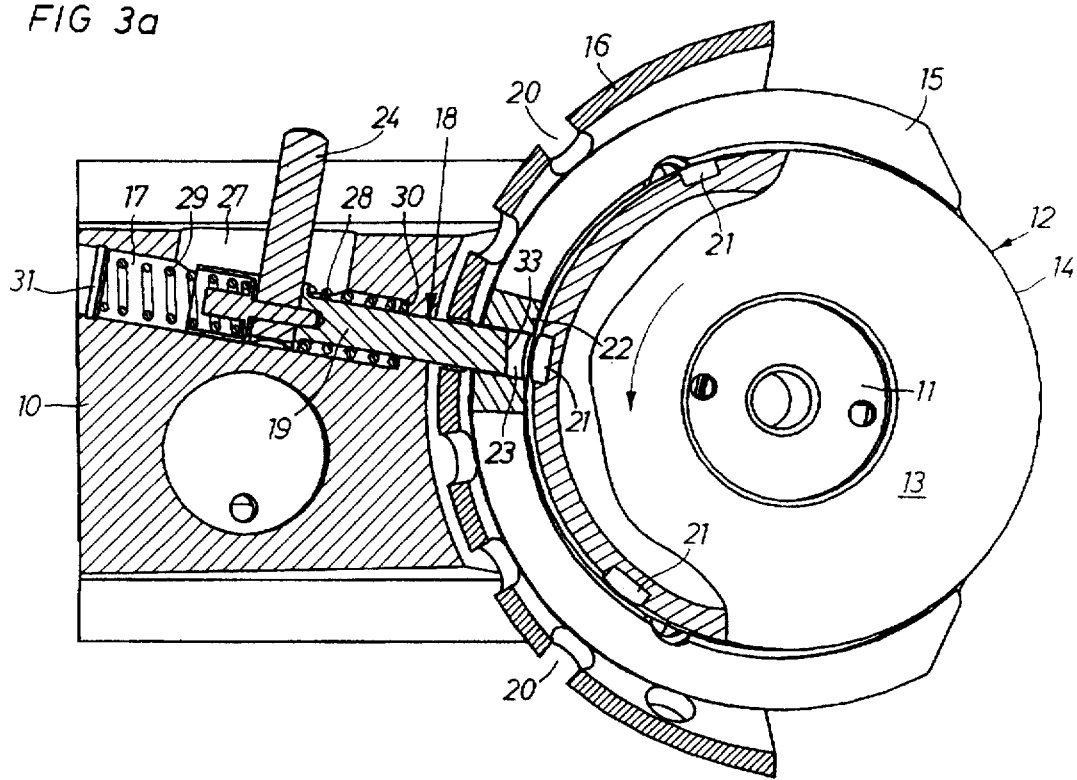
Figure 3B:
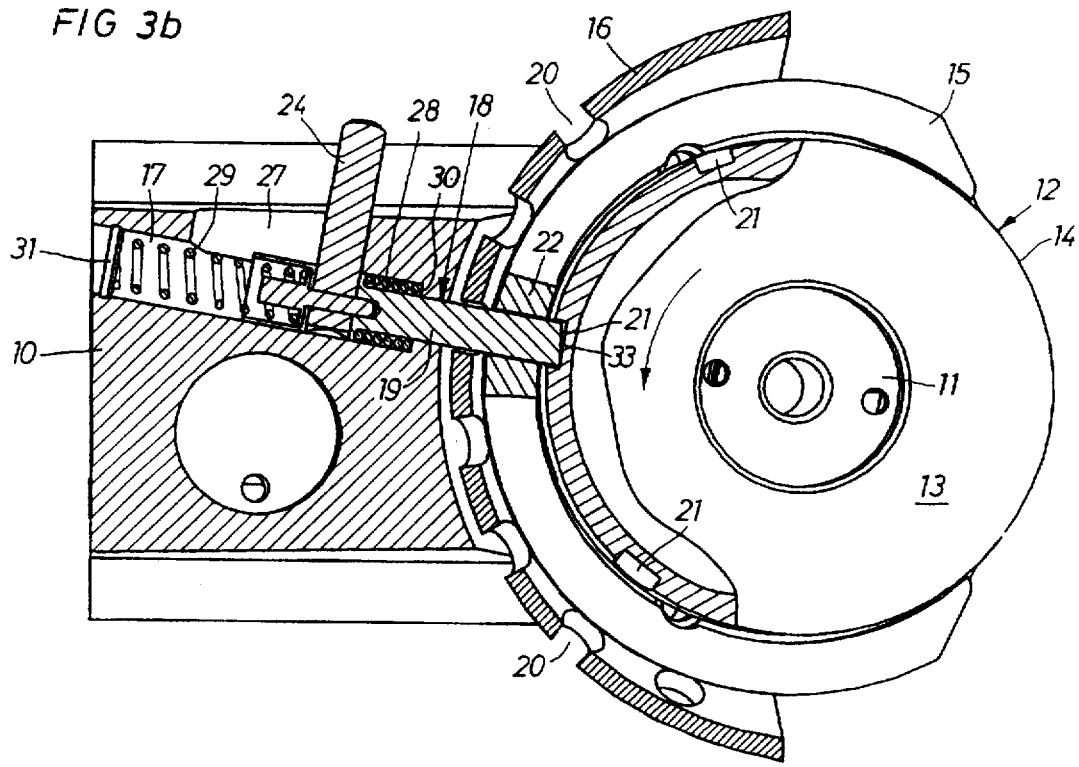
Figure 3C:
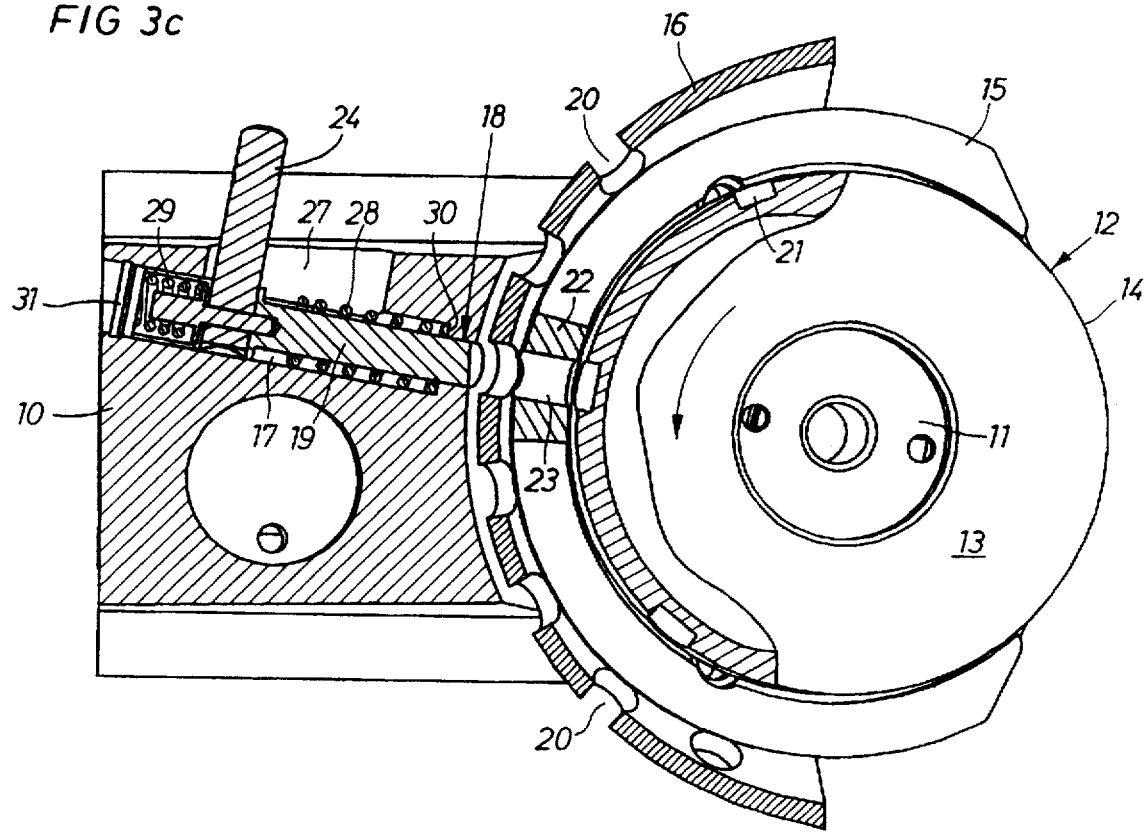
Figure 4:
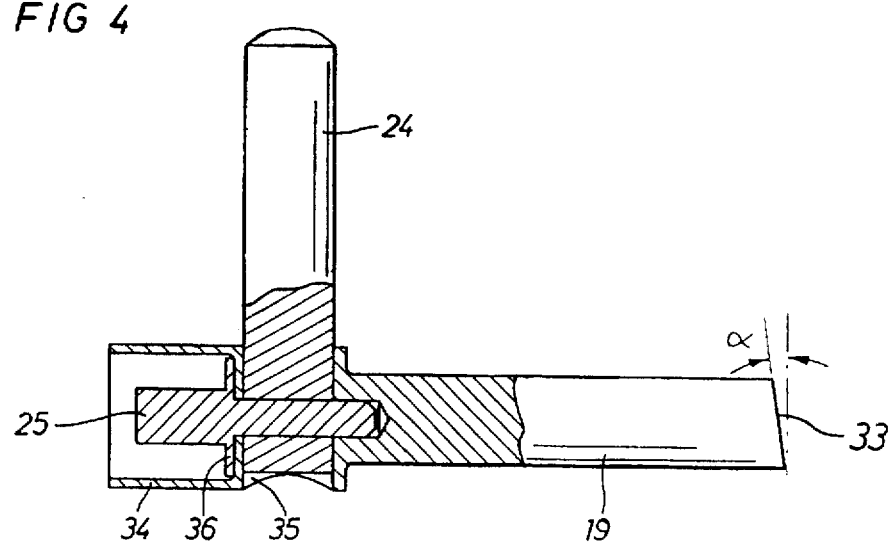

--A portable--;

Column 3, line 12 (claim 1, line 2), after "comprising"

insert --:--;

Column 3, line 13 (claim 1, line 3), delete "drivingly";

Column 3, line 19 (claim 1, line 9), delete "means";

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

Column 3, line 20 (claim 1, line 10), change "characterized" to --wherein--;

Column 3, line 21 (claim 1, line 11), delete "in that";

Column 3, line 22 (claim 1, line 12), after "and", insert --wherein--;

Column 3, line 23 (claim 1, line 13), change "it" to --said arresting device (18)--; and delete "means";

Column 3, line 24 (claim 1, line 14), change "it" to --said arresting device (18)--;

Cloumn 3, line 25 (claim 1, line 15), delete "means";

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

Column 3, line 26 (claim 1, line 16), change "either" to --at least--;

Column 3, line 27 (claim 1, line 17), change "it neither" to --said arresting device (18)--; after "engages" insert --neither--;

Column 3, line 28 (claim 1, line 18), delete "safety guard"; delete "means"; after "(20)" insert --on said safety guard (16)--; and change "anyone" to --any one--;

Column 3, line 30 (claim 2, line 1), change "Power" to --A power--;

Column 3, line 31 (claim 2, line 2), delete "means".

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

Column 3, line 33 (claim 3, line 1), change "Power" to --A power--;

Column 3, line 36 (claim 4, line 1), change "Power" to --A power--;

Column 3, line 37 (claim 4, line 2), delete "means";

Column 3, line 40 (claim 5, line 1), change "Power" to --A power--;

Column 3, line 44 (claim 6, line 1), change "Power" to --A power--;

Column 3, line 47 (claim 7, line 1), change "Power" to --A power--;

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

Column 3, line 50 (claim 8, line 1), change "Power" to --A power--;

Column 3, line 51 (claim 8, line 2), delete "means";

Column 3, line 54 (claim 9, line 1), change "Power" to --A power--;

Column 4, line 3 (claim 10, line 1), change "Power" to --A power--;

Column 4, line 7 (claim 11, line 1), change "Power" to --A power--;

Column 4, line 11 (claim 12, line 1), change "Power" to --A power--;

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

Column 4, line 15 (claim 13, line 1), change "Power" to --A power--;

Column 4, line 19 (claim 14, line 1), change "Power" to --A power--;

Column 4, line 22 (claim 15, line 1), change "Power" to --A power--;

Column 4, line 25 (claim 16, line 1), change "Power" to --A power--;

Column 4, line 28 (claim 17, line 1), change "Power" to --A power--;

Column 4, line 31 (claim 18, line 1), change "Power" to --A power--;

UNITED STATES PATENT AND TRADEMARK OFFICE
CERTIFICATE OF CORRECTION

PATENT NO. : 5,766,062
DATED : June 16, 1998
INVENTOR(S) : Jan Krister Johansson EDLING It is certified that error appears in the above-identified patent and that said Letters Patent is hereby corrected as shown below:

```
Column 4, line 34 (claim 19, line 1), change "Power" to
                --A power--;

Column 4, line 37 (claim 20, line 1), change "Power" to
                --A power--;

Column 4, line 40 (claim 21, line 1), change "Power" to
                --A power--;

Column 4, line 43 (claim 22, line 1), change "Power" to
                --A power--;

Column 4, line 46 (claim 23, line 1), change "Power" to
                --A power--;

Column 4, line 49 (claim 24, line 1), change "Power" to
                --A power--;
```

Signed and Sealed this

Eleventh Day of January, 2000

Attest:

Q. TODD DICKINSON

*Attesting Officer*  *Acting Commissioner of Patents and Trademarks*